(12) United States Patent
Greber

(10) Patent No.: US 9,567,884 B2
(45) Date of Patent: Feb. 14, 2017

(54) DEVICE FOR GENERATING AMMONIA

(71) Applicant: Faurecia Systemes D'Echappement, Nanterre (FR)

(72) Inventor: Frederic Greber, Ecot (FR)

(73) Assignee: Faurecia Systemes D'Echappement, Nanterre (FR)

( * ) Notice: Subject to any disclaimer, the term of this patent is extended or adjusted under 35 U.S.C. 154(b) by 152 days.

(21) Appl. No.: 13/908,237

(22) Filed: Jun. 3, 2013

(65) Prior Publication Data
US 2013/0327021 A1 Dec. 12, 2013

(30) Foreign Application Priority Data
Jun. 6, 2012 (FR) ...................................... 12 55277

(51) Int. Cl.
*F01N 3/00* (2006.01)
*F01N 3/20* (2006.01)

(52) U.S. Cl.
CPC .............. *F01N 3/00* (2013.01); *F01N 3/2066* (2013.01); *F01N 2610/02* (2013.01); *F01N 2610/06* (2013.01); *F01N 2610/10* (2013.01); *F01N 2610/1406* (2013.01); *F01N 2610/1413* (2013.01); *Y02T 10/24* (2013.01)

(58) Field of Classification Search
CPC .... F01N 3/2066; F01N 2610/02; F01N 3/208; F01N 2610/10; F01N 2610/1406; F01N 2610/1413; F01N 3/00; F01N 2610/06; Y02T 10/24
See application file for complete search history.

(56) References Cited

U.S. PATENT DOCUMENTS

| | | | | |
|---|---|---|---|---|
| 2,989,383 A | * | 6/1961 | Miller ................... | B01D 15/00 165/163 |
| 2002/0081239 A1 | * | 6/2002 | Palesch ................. | B01D 53/90 422/168 |
| 2010/0021780 A1 | * | 1/2010 | Johannessen ...... | B01D 53/8631 429/421 |

(Continued)

FOREIGN PATENT DOCUMENTS

| DE | 102007022858 A1 | 11/2008 |
|---|---|---|
| DE | 102009047338 A1 | 6/2011 |

(Continued)

OTHER PUBLICATIONS

FR Search Report from corresponding FR 12 55277, filed Jun. 6, 2012.

*Primary Examiner* — Thomas Denion
*Assistant Examiner* — Brandon Lee
(74) *Attorney, Agent, or Firm* — Carlson, Gaskey & Olds, PC

(57) ABSTRACT

An ammonia generating device is delimited by an outer casing that includes a main reservoir and a secondary reservoir. The main reservoir is capable of reloading with ammonia the body in the secondary reservoir. A heater is capable of heating the bodies in each reservoir. A connector connects the main reservoir to the secondary reservoir. The heater comprises first and second heating devices respectively installed inside the main reservoir and the secondary reservoir and operating independently. The main reservoir is thermally decoupled from the secondary reservoir to generate a temperature gradient between both reservoirs.

29 Claims, 5 Drawing Sheets

(56) References Cited

U.S. PATENT DOCUMENTS

| | | | |
|---|---|---|---|
| 2010/0062296 A1* | 3/2010 | Johannessen | 429/19 |
| 2010/0086467 A1* | 4/2010 | Johansen | C01C 1/006 423/352 |
| 2012/0045379 A1* | 2/2012 | Johannessen et al. | 423/235 |
| 2012/0288774 A1* | 11/2012 | Johannessen | B01D 53/8631 429/416 |
| 2013/0205757 A1* | 8/2013 | Boyd et al. | 60/274 |

FOREIGN PATENT DOCUMENTS

| | | | |
|---|---|---|---|
| DE | 102009047633 A1 | 6/2011 |
| EP | 1977817 A1 | 10/2008 |
| EP | 2236784 A1 | 10/2010 |
| WO | 2011133752 A1 | 10/2011 |

* cited by examiner

DEVICE FOR GENERATING AMMONIA

TECHNICAL FIELD

The present invention relates to a device for generating ammonia, notably for treating exhaust gases of internal combustion engines, as well as to the application method and to the method for regenerating this device.

The invention more particularly relates to a generating device comprising:
- a main reservoir and a second reservoir each having a body capable of releasing ammonia by desorption, the main reservoir being able to reload with ammonia the body in the secondary reservoir during a re-saturation step;
- a heater capable of heating the bodies in each reservoir to trigger desorption of ammonia; and
- a connector to connect the main reservoir to the secondary reservoir capable of allowing circulation of the released ammonia from the main reservoir to the secondary reservoir.

BACKGROUND

Document DE 10 2009 047 338 describes such an ammonia generating device including a reservoir separated into two portions to form a first central reservoir connected to the exhaust line of an automobile vehicle by controlled means for releasing the ammonia, here a metering valve, and a second reservoir. The first central reservoir has a size clearly smaller than that of the second reservoir. Each reservoir includes a different ammonia storage element, each element allowing release of the reducing agent following a desorption reaction. The first central reservoir is completely positioned inside the second reservoir and is connected to the latter through a switching valve, such as an anti-return valve.

Further, a heat generating element is positioned inside the first central reservoir.

The first central reservoir and the second reservoir are thermally connected to each other, so that when the heat generating element is activated, heat is also imparted to the second reservoir.

This ammonia generating device has the goal of allowing sufficient supply of reducing agent, regardless of the operating state of the vehicle, while limiting the energy required for releasing the reducing agent contained in the storage elements present in the first central reservoir and the second reservoir respectively.

Such an ammonia generating device is, however, complex to apply and may have uncertain operation notably when the heat produced by the heat generating element is insufficient for allowing the desorption reaction in the second reservoir, for example, when the vehicle covers a low mileage and when the duration for powering up the heat generating element is insufficient.

SUMMARY

The ammonia generating device according to the invention has the goal of finding a remedy to these drawbacks, by proposing a device efficiently heating the bodies contained in each reservoir, even when the heater produces heat over a short duration.

The ammonia generating device according to the invention also has the advantage of requiring a limited supply of energy and of being simple to apply.

An ammonia generating device of the aforementioned type including a heater that comprises first and second heating devices installed inside the main reservoir and the secondary reservoir respectively and operating independently. The main reservoir is thermally decoupled from the secondary reservoir to generate a temperature gradient between both reservoirs so that the ammonia released in the main reservoir is adsorbed by the body in the secondary reservoir during the re-saturation step.

According to other embodiments, the ammonia generating device may comprise one or more of the following features, taken individually or according to all technically possible combinations:
- each heating device may include a heat generating element of elongated shape and at least one heat transfer feature laid along the axial direction of the heat generating element and extending in a direction radial to the heat generating element;
- each heating device may include a draining feature allowing the discharge of the ammonia produced during the desorption reaction, the draining feature of the main reservoir and of the secondary reservoir being connected together through a connector;
- the draining feature may comprise a conduit extending inside each heat transfer feature intended to collect the released ammonia following the desorption reaction and a plurality of orifices connecting the conduit to the space of the reservoir surrounding the heat transfer feature;
- the outer casing may be made in metal, preferably in aluminium, in terrific stainless steel, or in austenitic stainless steel;
- the outer casing may have a substantially cylindrical shape and the secondary reservoir may be partly delimited by the side wall of the outer casing;
- the main reservoir may be delimited by walls in plastic material, preferably in polyamide, in polyvinyl chloride or in polyphenylene sulphide, allowing good thermal insulation of the reservoir;
- the device may include a path for releasing ammonia;
- the body capable of releasing ammonia may be a solid element, for example a salt, which may appear as a wafer having an outer diameter which has a shape mating the internal wall of the reservoir inside which the water is placed;
- the device may comprise two main reservoirs and a secondary reservoir, the main reservoirs being thermally insulated from the secondary reservoir and capable of reloading with ammonia the body in the secondary reservoir during the re-saturation step;
- the main reservoirs may be of different size, preferably the reservoirs may have a capacity of four liters and six liters respectively;
- the device may comprise two main reservoirs and two secondary reservoirs, the main reservoirs being thermally insulated from the secondary reservoirs, each main reservoir being capable of reloading with ammonia only the body in one of the secondary reservoirs during the re-saturation step.

The invention also relates to a method for applying the ammonia generating device according to the invention, characterized in that:
- during a first step, only the second heating device is activated to desorb the ammonia retained by the body present in the secondary reservoir, the first heating device being switched off; and during a second so called "re-saturation step," the second heating device is switched off and the first heating device is activated to generate a temperature gradient between the main reservoir and the secondary reservoir, the ammonia released in the main reservoir being adsorbed by the body contained in the secondary reservoir.

The invention also relates to a method for regenerating the ammonia generating device according to the invention, wherein the method comprises a step for injecting liquid ammonia aiming at saturating with ammonia the bodies positioned inside the main reservoir and the secondary reservoir respectively, the injected ammonia circulating in the draining feature or in circulation channels arranged in the side wall of the main reservoir.

These and other features may be best understood from the following drawings and specification.

BRIEF DESCRIPTION OF THE DRAWINGS

The invention will be better understood upon reading the description which follows, only given as an example and made with reference to the appended drawings wherein.

DETAILED DESCRIPTION

Figure 1:
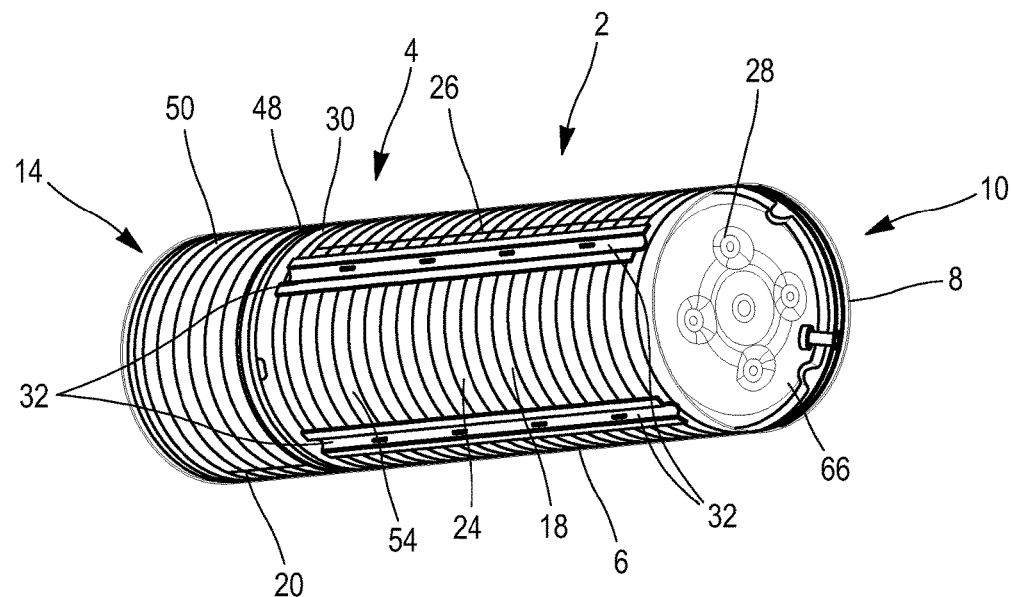
FIG. 1 illustrates a perspective view of an ammonia generating device according to the invention taken from a rear end of the device.

FIGS. 1 to 6 represent an ammonia generating device 2 according to the invention.

The ammonia generating device 2 includes a hollow and hermetic body 4 forming an outer casing. The body 4 is of a substantially cylindrical shape, delimited by a side wall 6 extending along a longitudinal axis X-X, an inlet wall 8 closing a rear end 10 of the body 4, and an outlet wall 12 closing a front end 14 of the body 4.

The side wall 6, the inlet wall 8, and the outlet wall 12 are made in metal, preferably in aluminium, in terrific stainless steel, for example 1.4509, or in austenitic stainless steel, for example 1.4301. The selected material should not oxidize in the presence of ammonia.

Figure 2:
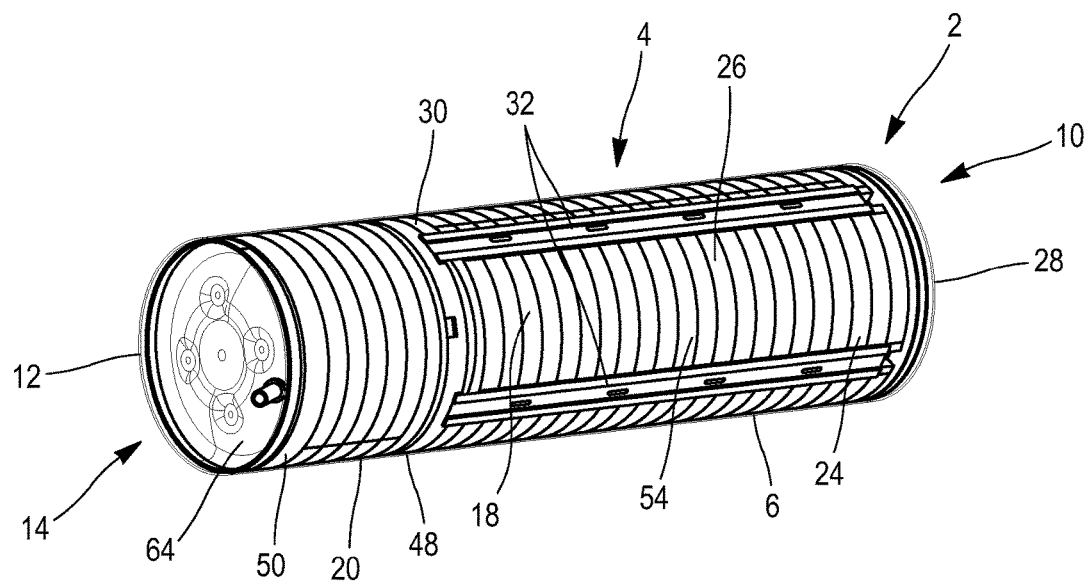
FIG. 2 illustrates a perspective view of the ammonia generating device illustrated in FIG. 1 taken from a front end of the device.

The side wall 6, the inlet wall 8, and the outlet wall 12 delimit together a receiving chamber 16, capable of receiving a main reservoir 18 and a secondary reservoir 20. In FIGS. 1 and 2, in order to better see the positioning of the main reservoir 18 and the secondary reservoir 20 inside the receiving chamber 16, the walls 6, 8, 12 delimiting the hollow body 4 have been illustrated so as to allow the reservoirs to be seen by transparency.

The main reservoir 18 is capable of allowing storage of an element which may release ammonia by desorption, such as a salt 22 saturated with ammonia, and has a hollow and hermetic body 24. The body 24 of the main reservoir 18 is of a substantially cylindrical shape, delimited by a side wall 26 extending along the longitudinal axis X-X, and an inlet wall 28 closing a rear end of the body 24, and an outlet wall 30 closing a front end of the body 24. The body 24 of the main reservoir 18 is made in plastic material so that the latter has good thermal insulation, for example the body may be made in polyamide (PA) which may be loaded with glass fibers, such as polyamide 6.6 or 12, in polyvinyl chloride (PVC) or in polyphenylene sulfide (PPS).

The side wall 26 of the main reservoir 18 has a length smaller than that of the side wall 6 of the body 4.

The main reservoir 18 is positioned in the receiving chamber 16 so that its inlet wall 28 and its side wall 26 bear against the inlet wall 8 and the side wall 6 of the body 4, respectively.

The main reservoir 18 and the outer casing of the body 4 may each comprise a maintaining feature, not shown, ensuring that the position of the reservoir 18 is maintained inside the outer casing of the body 4 to avoid any relative movement of the reservoir 18 inside the outer casing of the body 4.

Figure 4:
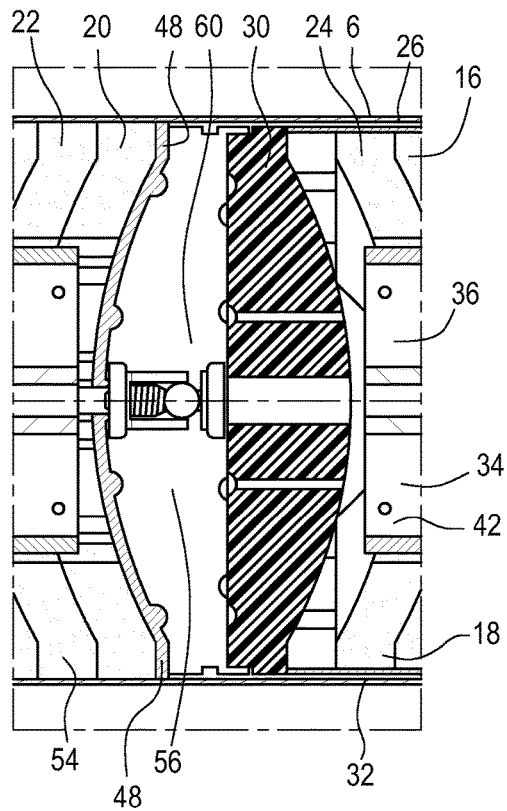
FIG. 4 illustrates an enlarged view of the area A of FIG. 3.
Figure 5:
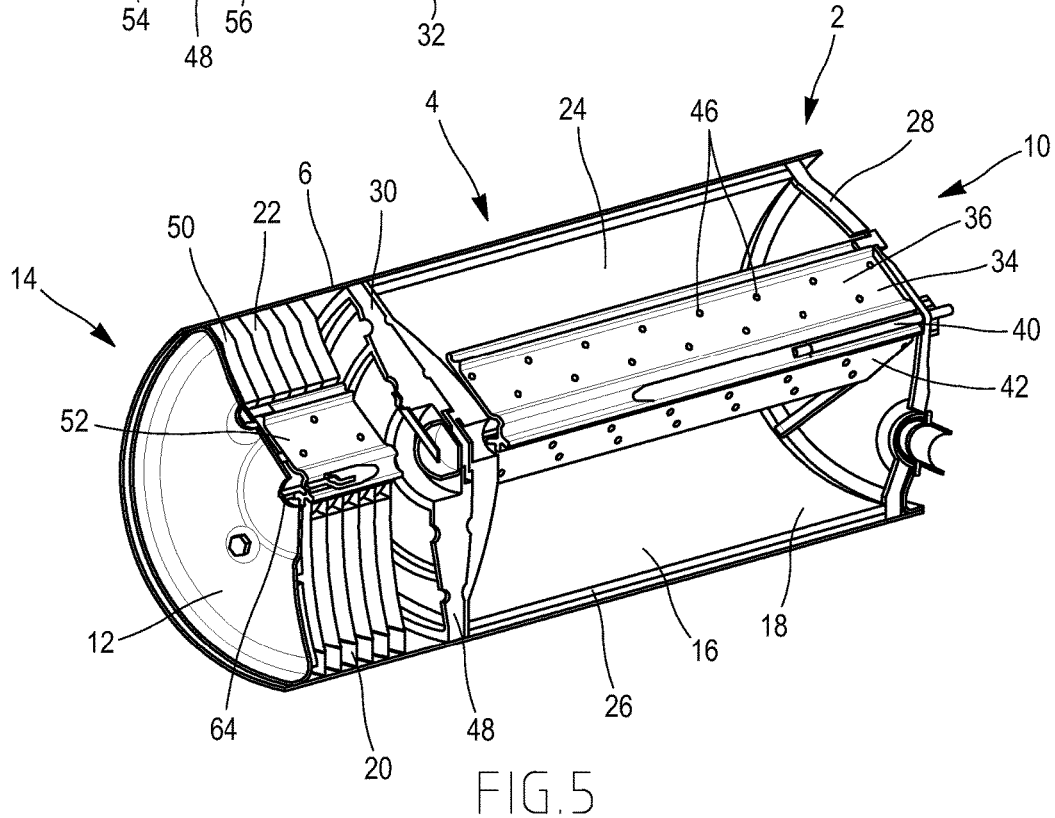
FIG. 5 illustrates a partial cutout view of the ammonia generating device of FIGS. 1 and 2.

As illustrated in FIGS. 1, 2 and 4, the side wall 26 of the main reservoir 18 may comprise perforated circulation channels 32, here four in number, the role of which will be specified subsequently.

Preferably, the outlet wall 30 is attached to the side wall 6.

A first heating device 34 is positioned inside the main reservoir 18. As this will be detailed subsequently, the first heating device 34 is used for heating the salt saturated with ammonia contained inside the main reservoir 18 in order to allow release of ammonia gas following a desorption reaction. The released ammonia may then be used as a reducing agent for treating the nitrogen oxides contained in the exhaust gases of internal combustion engines, notably of automobile vehicles.

The first heating device 34 comprises a heat generator 36 and a drain feature 38 for draining the released ammonia following the desorption reaction.

The heat generator 36 comprises a heat generating element 40 and at least one heat transfer feature 42.

The heat generating element 40 is connected to an electrical power supply, not shown, such as a pair of conducting wires, which allow the heat generating element 40 to heat the salt saturated with ammonia contained in the main reservoir 18.

As illustrated, the heat generating element 40 has an elongated shape, preferably a substantially cylindrical shape, and extends in the main reservoir 18 so that its axis extends parallel to the longitudinal axis X-X of the reservoir. Preferably, the axis of the heat generating element 40 coincides with the longitudinal axis of the reservoir 18.

Figure 6:
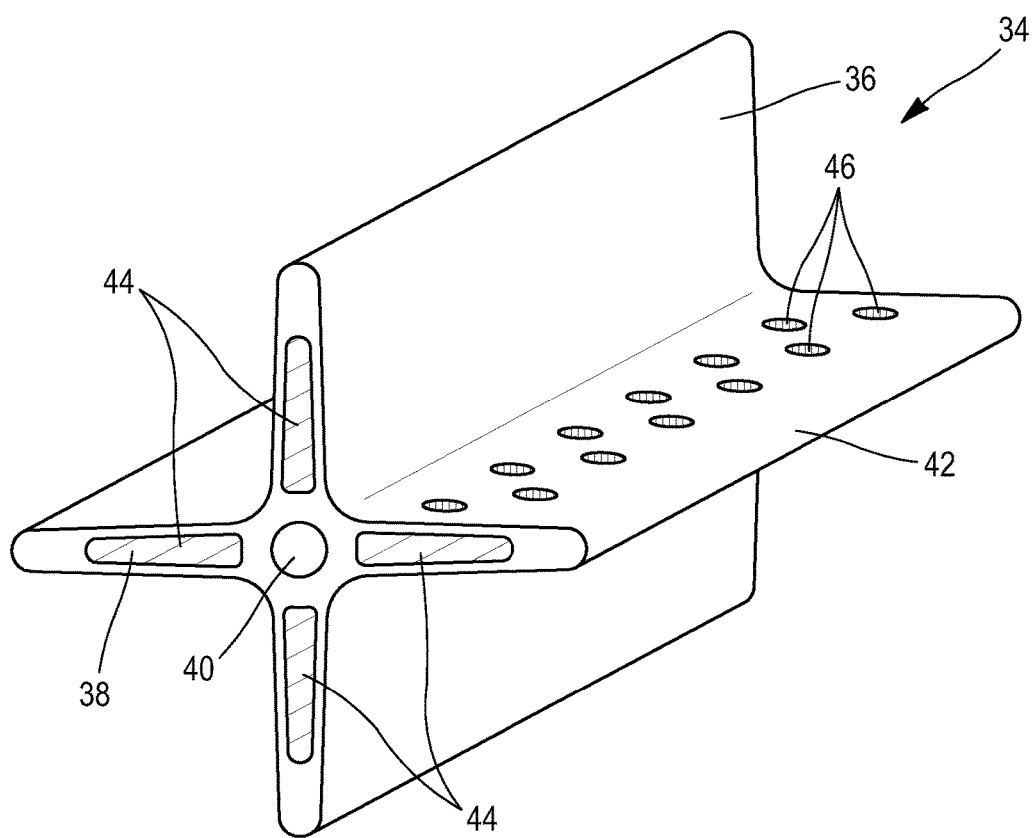
FIG. 6 illustrates a perspective view of a heating device fitting out the ammonia generating device of FIGS. 1 and 2.

According to the exemplary embodiment illustrated in FIG. 6, the heat transfer features 42 are four in number. Each heat transfer feature 42 appears as a plate and extends in a direction radial to the heat generating element 40.

Preferably, each heat transfer feature 42 extends over the whole length of the heat generating element 40 and parallel to the longitudinal axis of the latter.

Preferably, each heat transfer feature 42 and the heat generating element 40 substantially have the same length as the main reservoir 18.

Each heat transfer feature 42 comprises a material having high heat conductivity. The selected materials should, however, not oxidize in the presence of ammonia. The material making up each heat transfer feature 42 may, for example, be aluminum which may notably be extruded.

The heat transfer features 42 are regularly distributed all around the heat generating element 40. Thus, they are separated from each other by an angle of 90°, the heat generating element 40 being positioned in the center of the heat generator 36.

Figure 3:
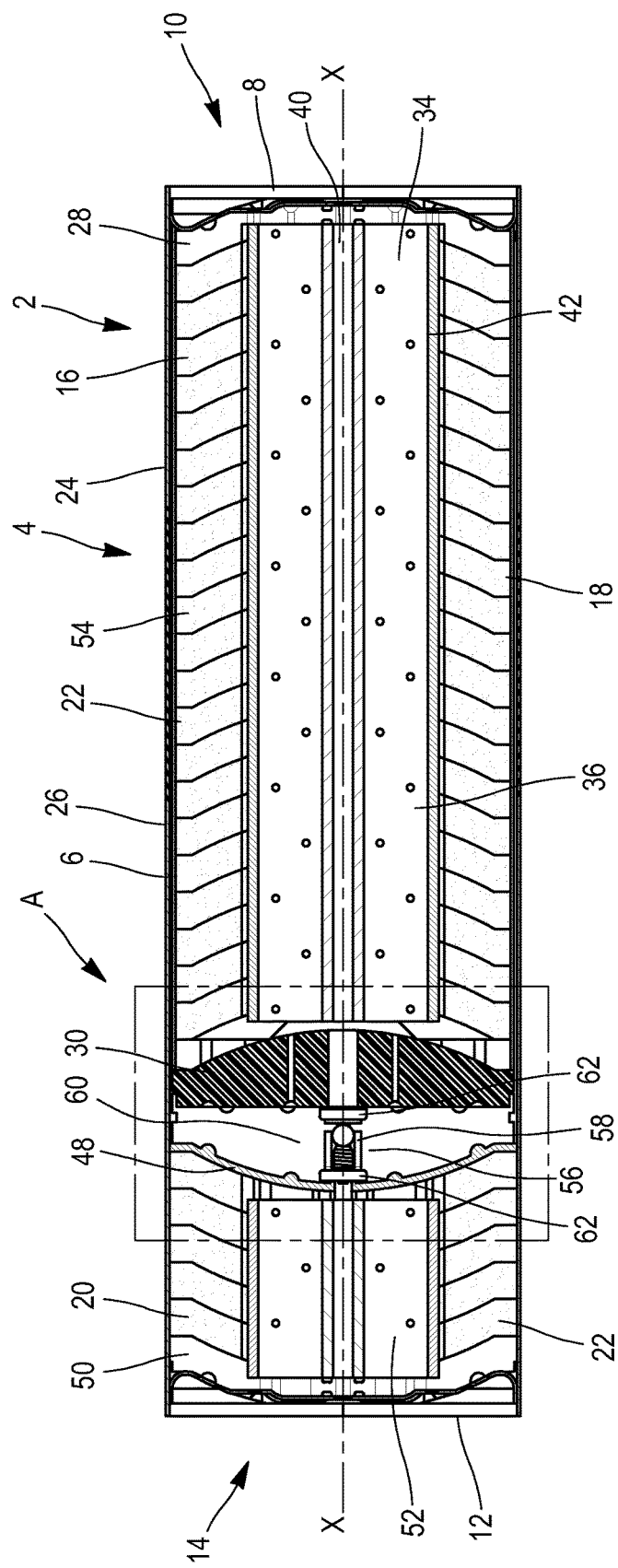
FIG. 3 illustrates a longitudinal sectional view of the device of FIGS. 1 and 2.

As illustrated in FIG. 3, each heat transfer feature 42 substantially has a width equal to a quarter of the diameter of the main reservoir 18.

Of course, according to the selected embodiment, the number of heat transfer features 42 may vary, the selection of this number may notably depend on the diameter of the reservoir 18. Preferably, each heat transfer feature 42 substantially has the same dimensions.

Each plate forming the heat transfer feature 42 comprises an inner conduit 44 intended to allow circulation of ammonia gas released following the desorption reaction and orifices 46 allowing connection of the inner conduit 44 to the space of the reservoir 18 surrounding the plate. These orifices 46 are regularly distributed along the plate and form, as this will be detailed subsequently, a path for circulating ammonia, and notably a way to bring the ammonia gas to the inner conduit 44 as well as a way to supply ammonia to the salt contained in the reservoir 18.

Thus, the conduits 44 and the orifices 46 form the drain feature 38 to drain the released ammonia.

The remaining space in the receiving chamber 16 between the outlet wall 30 of the main reservoir 18 and the outlet wall 12 of the outer casing delimits the location of the secondary reservoir 20 also capable of storing a salt saturated with ammonia.

The secondary reservoir 20 is delimited by a portion of the side wall 6 of the outer casing, as well as by an inlet wall 48 positioned in proximity to the outlet wall 30 of the main reservoir 18, and an outlet wall 50 bearing against the outlet wall 12 of the body 4.

Just like the main reservoir 18, the secondary reservoir 20 is also capable of allowing storage of an element which may release ammonia by desorption, such as a salt saturated with ammonia.

Further, inside the secondary reservoir 20 is positioned a second heating device 52, identical with the first heating device 34, the length of its heat generating element 40 and of its heat transfer feature 42 has been adapted to the length of this secondary reservoir 20 so that each heat transfer feature 42 and the heat generating element 40 substantially have the same length as the secondary reservoir 20.

The salt saturated with ammonia, contained in each reservoir may appear as a wafer 54. Preferably, each wafer 54 has an outer diameter with a shape mating the inner wall of the reservoir inside which it is positioned.

The storage material allowing release of the ammonia following a desorption reaction may correspond to one of the materials described in patent application WO 2008/077652. The material is for example selected from the group known under the name of metal amine complexes, and having the general formula $M_a (NH_3)_n e_z$, wherein M is one or several cations selected from the Group of alkaline metals such as Li, Na, K or Cs, of alkaline metals such as Mg, Ca, or Sr, and/or transition metals such as V, Cr, Mn, Fe, Co, Ni, Cu, or Zn, or of combinations of these metals such as NaAl, KAl, $K_2Zn$, CsCu, or $K_2Fe$, X being one or more anions selected from the group comprising fluorides, chlorides, bromides, iodides, nitrates, thiocyanates, sulfates, molybdates, phosphate ions, a being the number of cations per salt molecule, z being the number of anions per salt molecule and n being a coordination number comprised between 2 and 12. For example, the material making up the cartridge is $Mg(NH_3)_6Cl_2$, or $Sr(NH_3)_8Cl_2$ or further $Ca(NH_3)_8Cl_2$, or a mixture of these elements.

Inside each reservoir 18, 20, a free space is provided in order to allow expansion of the salt, notably when the latter is reloaded with ammonia.

Preferably, the volume of the secondary reservoir 20 corresponds to a quarter of the one of the main reservoir 18.

In the case when the ammonia generating device is intended to deliver ammonia gas to an exhaust line of an automobile vehicle, the secondary reservoir 20 is dimensioned so as to meet the ammonia needs of the vehicle, notably over a distance from 400 to 800 kilometers.

The inlet wall 48 of the secondary reservoir 20 and the outlet wall 30 of the main reservoir 18 are connected via a connector 56 that connects the main reservoir 18 to the secondary reservoir 20.

These connectors 56 are adapted to allow the ammonia released in the main reservoir 18 subsequent to a desorption reaction, to reload the salt contained in the secondary reservoir 20, as this will be detailed subsequently.

These connectors 56 comprise a channel 58 inside of which is positioned an anti-return valve 60. At each end of the channel 58, protective filters 62 are positioned, preventing the particles of the wafers, from blocking the valve 60.

The channel 58 gives the possibility of connecting the inner conduits 44 belonging to the drain feature 38 of the first heating device 34 and of the second heating device 52, respectively.

Each heating device 34, 52 contained in the main reservoir 18 and in the secondary reservoir 20 operates independently.

Each heat generating element 40 of a heating device is connected to an electronic control unit (ECU), not shown, allowing independent control of the electrical powering up of each element.

Further, the outlet wall 12 of the ammonia generating device 2 is provided with a path 64 for releasing the ammonia, formed by a channel crossing the outlet wall 50 of the secondary reservoir 20 and connected to the inner conduits 44 of the second heating device 52, to a way for diffusing the ammonia, for example in the exhaust line of the vehicle.

Preferably, an anti-return valve, not shown, is positioned inside the channel, in order to control the release of ammonia.

Further, the inlet wall 8 of the body 4 may be provided with a path 66 for filling up the main reservoir 18 with ammonia, formed by a channel crossing the inlet wall 28 of the main reservoir 18 and connected to the inner conduits 44 of the first heating device 34.

From this point, the operation of an ammonia generating device intended to deliver ammonia gas to an exhaust line of an automobile vehicle, will be described.

As soon as the ECU detects the starting of the vehicle, the ECU orders the electrical powering up of the heat generating element 40 installed in the secondary reservoir 20.

The heat generated by the heat generating element 40 is diffused to the heat transfer feature 42 by the good conductivity of the material making up this element, and then to the saturated salt surrounding said heat generator 36. A desorption reaction is then triggered, generating release of the ammonia contained in the salt, the latter is then desorbed from the salt.

The released ammonia is then free to circulate in the inner conduits 44 via the orifices 46, and then in the channel of the release path 64 thus allowing the outflow of the ammonia gas from the secondary reservoir 20 through the anti-return valve towards the exhaust line.

During this step, only the second heating device 52 is electrically powered, the first heating device 34 installed in the main reservoir 18 being switched off. Thus, during this step, the ammonia contained in the saturated salt present in the main reservoir 18 does not desorb, or only very little. Indeed, this reservoir, the walls of which are made in a thermally insulating material, is thermally decoupled from the secondary reservoir 20, which prevents or very strongly limits any desorption of ammonia in the main reservoir.

When the ECU detects that the autonomy of the secondary reservoir 20 is lowered, and that it is for example the order of 100 kilometers, it controls the stopping of the electrical powering of the heat generating element 40 of the secondary reservoir 20 and triggers the electric powering up of the heat generated element 40 of the main reservoir 18.

The temperature then very rapidly decreases in the secondary reservoir 20, the latter not being protected by a thermally insulating side wall. In the main reservoir 18, the heat generated by the heat generating element 40 is diffused to the heat transfer feature 42 positioned in the main reservoir 18, and then to the saturated salt surrounding said heat generator 36. A desorption reaction is then triggered in the main reservoir 18, generating the release of the ammonia contained in the salt.

The released ammonia is then free to circulate in the inner conduits 44 via the orifices 46, and then in the channel 58 belonging to the connector 56 thereby allowing the outflow of ammonia gas from the main reservoir 18 through the anti-return valve 60 to the secondary reservoir 20.

The released ammonia is then free to circulate in the inner conduits 44 of the second heating device positioned in the secondary reservoir 20. A portion of this ammonia reaches the channel of the release path 64 thereby allowing the outflow of ammonia gas from the secondary reservoir 20 through the anti-return valve to the exhaust line. The other portion of the released ammonia allows re-saturation of the salt present in the secondary reservoir 20, by circulating through the orifices 46 of the second heating device 52.

Such a re-saturation is facilitated by the temperature gradient existing between the main reservoir 18 and the secondary reservoir 20, this gradient being maintained in spite of the exothermic reaction of ammonia adsorption by the salt. Indeed, the salt contained in the secondary reservoir 20 all along the adsorption reaction is cooled by the side wall 6 of this non-thermally protected reservoir and permanently cooled by the ambient air circulating on the outside of the ammonia generating device around the side wall 6.

Generally, the re-saturation step of the salt contained in the secondary reservoir 20 lasts between a quarter of an hour and half an hour. Of course, this depends on the size of the secondary reservoir 20.

As soon as the ECU detects that the re-saturation time of the salt contained in the secondary reservoir 20 is attained, the ECU orders the stopping of the electrical powering of the heat generating element 40 of the main reservoir 18 and activates the electrical powering up of the heat generating element 40 of the secondary reservoir 20 so that the ammonia retained in the salt of the latter in turn feeds the exhaust line.

The release of ammonia from the main reservoir 18 is then rapidly stopped, because of the stopping of heat production by the first heating device 34, but also because the salt contained in the secondary reservoir 20 is in turn heated, blocking any adsorption reaction.

As soon as the ammonia retained in the salt of the secondary reservoir 20 again diminishes, the operation for filling the secondary reservoir described above is repeated.

When the amount of ammonia retained by the salt contained in the main reservoir 18 is not sufficient for reloading the secondary reservoir 20, the salts contained in the main reservoir 18 and the secondary reservoir 20 respectively, may be reloaded by injecting ammonia preferably in liquid form having a low temperature preferably comprised between +10° C. and −17° C. via the filling path 66.

The ammonia is introduced into the filling path 66 via an injector, not shown. The ammonia may then re-saturate the salt present in the main 18 and secondary 20 reservoirs, by circulating through the inner conduits 44 and the orifices 46 of each heat transfer feature 42. The circulation of ammonia between the main reservoir 18 and the secondary reservoir 20 is ensured by the connector 56.

In the case when the side wall 26 is provided with perforated circulation channels 32 as described earlier, the latter may also be connected to the filling path 66 to allow circulation of ammonia in the salt and re-saturate the latter, the excess of liquid ammonia is then discharged by the drain feature 38.

The injection of liquid ammonia at a low temperature during the regeneration method described above has the advantage of permanently cooling the salt which has to adsorb ammonia. This cooling thus allows limitation of the heat produced during the adsorption and therefore an increase in the amount of ammonia trapped in the salt.

According to a particular embodiment, the main reservoir and the secondary reservoir may each contain a salt of a different nature each having a different adsorption temperature. Preferably, in order to promote adsorption, the salt containing the secondary reservoir has an adsorption temperature below the one of the salt contained in the main reservoir.

The excess of liquid ammonia may be discharged by a discharging path provided for this purpose, preferably the discharging path may be formed by the release path 64. It is then possible to establish a circulation of ammonia in a closed circuit between the release path 64 and the path allowing injection of ammonia into the main reservoir 18, such a circulation further allows improvement in the cooling of the device which is favorable to adsorption of ammonia as indicated above.

Figure 7:
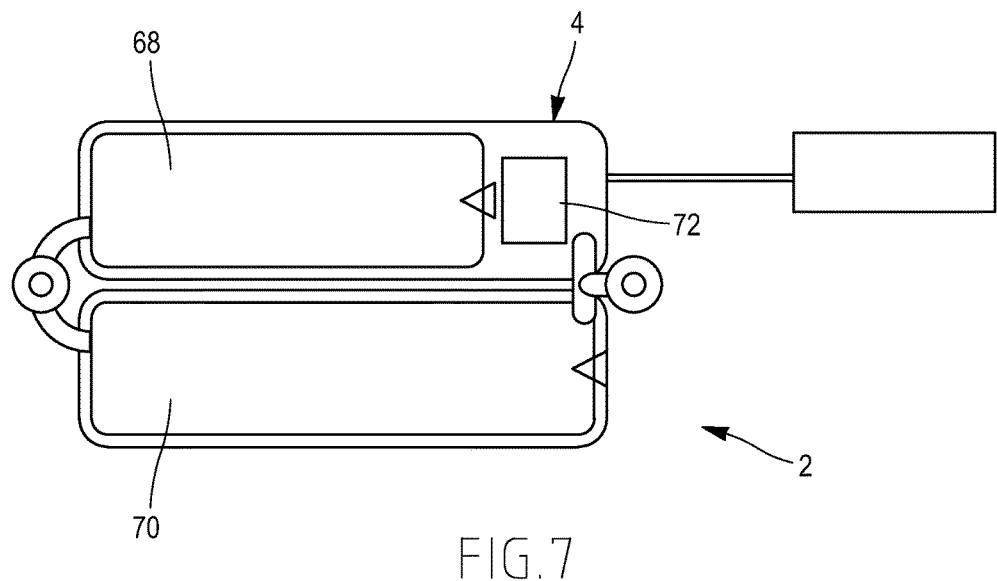
FIG. 7 illustrates a block diagram of a first alternative embodiment of the ammonia generating device.

According to a first alternative embodiment illustrated in FIG. 7, the ammonia generating device 2 may comprise two main reservoirs 68 and 70 and a secondary reservoir 72, the main reservoir 68 and 70 are adapted so as to allow re-saturation of the salt contained in the secondary reservoir 72 independently.

As in the embodiment illustrated in FIGS. 1 to 6, the main reservoirs 68 and 70 and the secondary reservoir 72, are each capable of allowing storage of an element which may be release ammonia by desorption and each have an independent heating device in order to trigger this desorption step.

Each main reservoir 68 or 70 is thermally insulated from the secondary reservoir 72, to form a temperature gradient favorable for regeneration of the salt contained in the secondary reservoir 72 when one of the main reservoirs reloads the salt contained in the secondary reservoir.

According to the selected strategy, the main reservoir 68, 70 may reload the secondary reservoir 72 alternately, in this case, the reservoir reloading the salt contained in the secondary reservoir changes at each new re-saturation step, or one after the other, in this case a first main reservoir is first emptied and then the other one.

Such a layout gives the possibility of limiting the energy consumption required for heating the main reservoirs. Indeed, the main reservoirs being of a smaller size than the one described in connection with FIGS. 1 to 6 for a regeneration device of identical size, less energy is required for triggering the desorption reaction.

In the case when these main reservoirs alternately reload the secondary reservoir, these reservoirs may be of different sizes, for example the reservoirs may have a capacity of four liters and of six liters respectively. Such a layout has the advantage of being able to alert the driver as soon as his/her reserve of ammonia attains a limiting threshold value. Indeed, as soon as it is detected that the main reservoir having the smallest volume is no longer capable of releasing ammonia, an alert may be delivered to the driver of the vehicle so as to have him proceed with the maintenance of his/her vehicle. An additional amount of ammonia may nevertheless be released by the main reservoir of larger size and allow release of ammonia until the next maintenance.

In this embodiment, the main reservoir 68, 70 and the secondary reservoir 72 are connected together in order to achieve the regeneration step for the different reservoirs during a single step.

Figure 8:
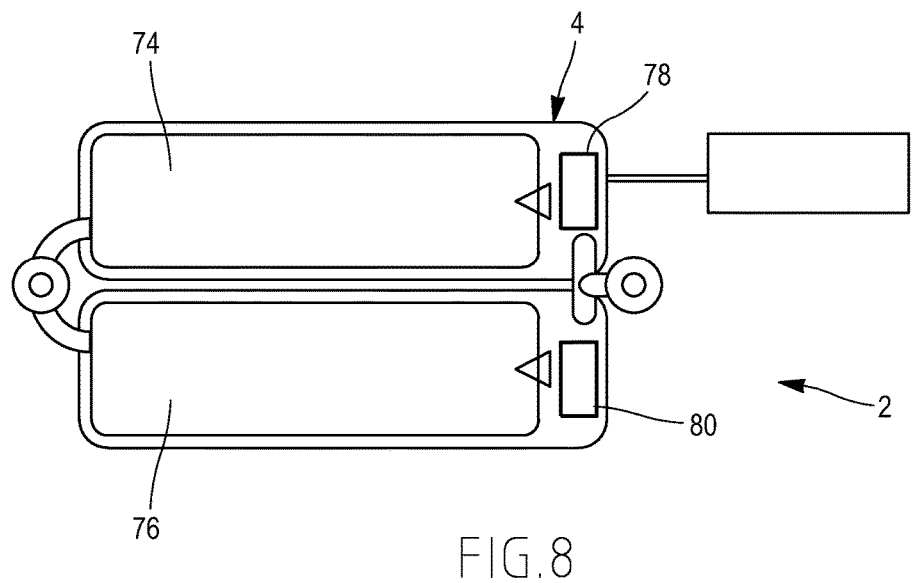
FIG. 8 illustrates a block diagram of a second alternative embodiment of the ammonia generating device.

According to a second alternative embodiment illustrated in FIG. 8, the ammonia generating device 2 may comprise two main reservoirs 74 and 76 and two secondary reservoirs 78 and 80, each main reservoir being adapted for allowing re-saturation of a secondary reservoir.

Like in the embodiment illustrated in FIGS. 1 to 6, the main reservoir 74 and 76 and the secondary reservoir 78 and 80 are each capable of allowing storage of an element which may release ammonia by desorption and each have an independent heating device in order to trigger this desorption step.

Each main reservoir 74, 76 is thermally insulated from the secondary reservoir 78, 80 respectively to which it is connected so as to allow saturation of the salt contained in the latter.

Such a layout also allows limitation of the energy consumption required for heating the main and secondary reservoirs, the latter being of a smaller size than those described in connection with FIGS. 1 to 6 for a generating device of identical size.

In this embodiment, the main reservoirs 74, 76 and the secondary reservoirs 78 and 80 are connected together in order to carry out the regeneration step for different reservoirs during a single step.

Such a generating device has the advantage of allowing rapid heating up of the salt contained in the secondary reservoir and thus allows sufficient release of ammonia while limiting the required supply of energy.

Further, the generating device gives the possibility of draining the released ammonia and of efficiently bringing it to the means for diffusing ammonia in the exhaust line of the vehicle.

Such a generating device is simple to apply and has limited cost.

Further, as this has been described earlier, the ammonia generating device according to the invention has the advantage of being able to be easily regenerated, notably without disassembling the ammonia generating device fitting out the vehicle, in the case when the device is accessible from the outside of the vehicle. This has the advantage of simplifying the handling of spare parts at a dealer's.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An ammonia generating device to treat exhaust gases of internal combustion engines comprising:
an outer casing comprising a single hollow and hermetic body defining a receiving chamber configured to receive a main reservoir and a secondary reservoir, the main reservoir having a main body capable of releasing ammonia by desorption and the secondary reservoir having a secondary body capable of releasing ammonia by desorption, the main reservoir being able to reload the secondary body in the secondary reservoir with ammonia during a re-saturation step;
an outlet in the outer casing that fluidly connects the secondary reservoir to an exhaust line, and wherein the main reservoir and the secondary reservoir are serially arranged such that the main reservoir is fluidly connected to the outlet only through the secondary reservoir;
a heater capable of heating the bodies in each reservoir to trigger off the desorption of ammonia;
a connector located within the outer casing, the connector to connect the main reservoir to the secondary reservoir and being capable of allowing circulation of the released ammonia from the main reservoir to the secondary reservoir, wherein the heater comprises first and second heating devices installed inside the main reservoir and the secondary reservoir respectively and operating independently; and
wherein the main reservoir is thermally decoupled from the secondary reservoir to generate a temperature gradient between both reservoirs so that the released ammonia in the main reservoir is adsorbed by the secondary body in the secondary reservoir during the re-saturation step.

2. The ammonia generating device according to claim 1, wherein each heating device comprises a heater element having an elongated shape and at least one heat transfer feature laid out along an axial direction of the heater element and extending in a direction radially to the heater.

3. The ammonia generating device according to claim 1, wherein each heating device includes a drain that allows the discharge of the ammonia produced during the desorption reaction, and wherein the drain is configured to drain the main reservoir and the secondary reservoir which are connected together through the connector.

4. The ammonia generating device according to claim 3, wherein the drain comprises a conduit extending inside each heat transfer feature that is configured to connect the released ammonia following the desorption reaction and a plurality of orifices connecting the conduit to a space of the reservoir surrounding the heat transfer feature.

5. The ammonia generating device according to claim 1, wherein the outer casing is made in metal, and wherein the metal comprises one of aluminium, ferritic stainless steel, or in austenitic stainless steel.

6. The ammonia generating device according to claim 1, wherein the outer casing has a substantially cylindrical shape and the secondary reservoir is partly delimited by a side wall of the outer casing.

7. The ammonia generating device according to claim 1, wherein the main reservoir is delimited by walls of plastic material, wherein the plastic material comprises one of polyamide, polyvinyl chloride, or in polyphenylene sulfide to provide good thermal insulation of the reservoir.

8. The ammonia generating device according to claim 1, including a path for releasing ammonia.

9. The ammonia generating device according to claim 1, wherein the body capable of releasing ammonia is a solid element, and comprises a salt formed as a wafer having an outer diameter which has a shape mating an internal wall of the reservoir inside which the water is placed.

10. The ammonia generating device according to claim 1, including two main reservoirs and one secondary reservoir, the main reservoirs being thermally insulated from the secondary reservoir and capable of reloading with ammonia the body in the secondary reservoir during the re-saturation step.

11. The ammonia generating device according to claim 10, wherein the main reservoirs are of different size.

12. The ammonia generating device according to claim 1, including two main reservoirs and two secondary reservoirs, the main reservoirs being thermally insulated from the secondary reservoirs, each main reservoir being able to reload with ammonia only the body in one of the secondary reservoirs during the re-saturation step.

13. A method for applying an ammonia generating device to treat exhaust gases of internal combustion engines, the ammonia generating device comprising an outer casing comprising a single hollow and hermetic body defining a receiving chamber configured to receive a main reservoir and a secondary reservoir, the main reservoir having a main body capable of releasing ammonia by desorption and the secondary reservoir each having a secondary body capable of releasing ammonia by desorption, the main reservoir being able to reload the secondary body in the secondary reservoir with ammonia during a re-saturation step, an outlet in the outer casing that fluidly connects the secondary reservoir to an exhaust line, and wherein the main reservoir and the secondary reservoir are serially arrnaged such that the main reservoir is fluidly connected to the outlet only through the secondary reservoir, a heater capable of heating the bodies in each reservoir to trigger off the desorption of ammonia, a connector located within the outer casing to connect the main reservoir to the secondary reservoir and being capable of allowing circulation of the released ammonia from the main reservoir to the secondary reservoir, wherein the heater comprises first and second heating devices installed inside the main reservoir and the secondary reservoir respectively and operating independently, and wherein the main reservoir is thermally decoupled from the secondary reservoir to generate a temperature gradient between both reservoirs so that the released ammonia in the main reservoir is adsorbed by the secondary body in the secondary reservoir during the re-saturation step, the method comprising:

during a first step, only the second heating device is activated to desorb the ammonia retained by the body present in the secondary reservoir, the first heating device being switched off; and during a second re-saturation step, the second heating device is switched off and the first heating device is activated to generate a temperature gradient between the main reservoir and the secondary reservoir, the released ammonia in the main reservoir being adsorbed by the body in the secondary reservoir.

14. The method for regenerating a device according to claim 13, including the step of injecting liquid ammonia aiming at saturating with ammonia the bodies respectively positioned inside the main reservoir and the secondary reservoir, the injected ammonia circulating in a drain or in circulation channels arranged in a side wall of the main reservoir.

15. The method for regenerating a device according to claim 13, wherein each heating device includes a drain comprising at least one open conduit.

16. The ammonia generating device according to claim 1, wherein each heating device includes a drain comprising at least one open conduit.

17. The ammonia generating device according to claim 16, wherein the at least one open conduit is substantially straight.

18. An ammonia generating device to treat exhaust gases of internal combustion engines, the ammonia generating device comprising:

an outer casing defining a central axis and having an outer wall enclosing a receiving chamber;

a main reservoir located within the receiving chamber and having a main body capable of releasing ammonia by desorption;

a secondary reservoir located within the receiving chamber such that the main and secondary reservoirs are axially spaced apart from each other while being completely surrounded by the outer wall, and including an outlet in the outer casing that fluidly connects the secondary reservoir to an exhaust line, and wherein the main reservoir and the secondary reservoir are serially arranged such that the main reservoir is fluidly connected to the outlet only through the secondary reservoir, and wherein the secondary reservoir has a secondary body capable of releasing ammonia by desorption, and wherein the main reservoir is able to reload the secondary body in the secondary reservoir with ammonia during a re-saturation step;

a first heater installed inside the main reservoir;

a second heater installed inside the secondary reservoir, wherein the first heater and the second heater operate independently of each other;

a connector located within the outer casing to connect the main reservoir to the secondary reservoir, wherein the connector is configured to allow circulation of released ammonia from the main reservoir to the secondary reservoir; and wherein the main reservoir is thermally decoupled from the secondary reservoir to generate a temperature gradient between the main and secondary reservoirs so that the released ammonia in the main reservoir is adsorbed by the secondary body in the secondary reservoir during the re-saturation step.

19. The ammonia generating device according to claim 18, wherein each of the first and second heaters includes a drain configured to drain released ammonia following a desorption reaction.

20. The ammonia generating device according to claim 19, wherein the drain comprises at least one open conduit forming a drain path through the heater.

21. The ammonia generating device according to claim 20, wherein the at least one conduit comprises a plurality of conduits that are parallel to each other.

22. The ammonia generating device according to claim 18, wherein each of the first and second heaters comprises an elongated substantially cylindrical heat generating center portion with a plurality of heat transfer plates extending radially outwardly from the center portion, and wherein the drain is formed at least in one of the heat transfer plates.

23. The ammonia generating device according to claim 22, wherein each heat transfer plate includes an internal open conduit and a plurality of orifices that are formed on an external surface of the heat transfer plate and are in fluid communication with the internal open conduit.

24. The ammonia generating device according to claim 18, wherein the main reservoir includes a side wall that bears against the outer wall of the outer casing.

25. The ammonia generating device according to claim 18, wherein the outer wall of the outer casing comprises a substantially cylindrical side wall that extends around a central axis, and wherein the main reservoir includes a side wall that extends around the central axis and bears against the cylindrical side wall of the outer casing.

26. The ammonia generating device according to claim 1, wherein the main reservoir includes a side wall that bears against a body of the outer casing.

27. The ammonia generating device according to claim 1, wherein the outer casing includes a substantially cylindrical side wall that extends around a central axis, and wherein the main reservoir includes a side wall that extends around the central axis and bears against the cylindrical side wall of the outer casing.

28. The method according to claim 13, wherein the main reservoir includes a side wall that bears against a body of the outer casing.

29. The method according to claim 13, wherein the outer casing includes a substantially cylindrical side wall that extends around a central axis, and wherein the main reservoir includes a side wall that extends around the central axis and bears against the cylindrical side wall of the outer casing.

* * * * *

UNITED STATES PATENT AND TRADEMARK OFFICE
CERTIFICATE OF CORRECTION

PATENT NO. : 9,567,884 B2  
APPLICATION NO. : 13/908237  
DATED : February 14, 2017  
INVENTOR(S) : Frederic Greber Page 1 of 1

It is certified that error appears in the above-identified patent and that said Letters Patent is hereby corrected as shown below:

In the Claims

In Claim 4, Column 10, Line 50; after "inside" replace "each" with --a--

In Claim 5, Column 10, Line 58; before "austenitic" delete "in"

In Claim 7, Column 10, Line 66; before "polyphenylene" delete "in"

In Claim 9, Column 11, Line 7; before "is placed" replace "water" with --wafer--

In Claim 13, Column 11, Line 29; after "reservoir" delete "each"

In Claim 13, Column 11, Line 35; after "serially" replace "arrnaged" with --arranged--

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*